(12) United States Patent
Cook

(10) Patent No.: US 7,315,092 B2
(45) Date of Patent: Jan. 1, 2008

(54) WAVE POWERED ELECTRIC GENERATING DEVICE

(76) Inventor: Glen Cook, 89 Prospect St., Simpson, PA (US) 18407

( * ) Notice: Subject to any disclaimer, the term of this patent is extended or adjusted under 35 U.S.C. 154(b) by 81 days.

(21) Appl. No.: 11/378,037

(22) Filed: Mar. 17, 2006

(65) Prior Publication Data

US 2006/0208494 A1    Sep. 21, 2006

Related U.S. Application Data

(60) Provisional application No. 60/662,582, filed on Mar. 18, 2005.

(51) Int. Cl.
  *F03B 13/12* (2006.01)
(52) U.S. Cl. .............. 290/53; 290/42; 60/507
(58) Field of Classification Search ............. 290/42, 290/43, 53, 54, 44, 55; 60/507, 505
  See application file for complete search history.

(56) References Cited

U.S. PATENT DOCUMENTS

| | | | | |
|---|---|---|---|---|
| 917,411 | A * | 4/1909 | Secondo et al. | .............. 60/500 |
| 1,925,742 | A * | 9/1933 | Bamber et al. | ............... 60/505 |
| 3,970,415 | A * | 7/1976 | Widecrantz et al. | ........ 417/332 |
| 4,098,084 | A | 7/1978 | Cockerell | |
| 4,118,932 | A * | 10/1978 | Sivill | ........................... 60/500 |
| 4,319,454 | A | 3/1982 | Lucia | |
| 4,389,843 | A * | 6/1983 | Lamberti | ...................... 60/507 |
| 4,408,455 | A * | 10/1983 | Montgomery | ................ 60/505 |
| 4,480,966 | A * | 11/1984 | Smith | ......................... 417/332 |
| 4,560,884 | A * | 12/1985 | Whittecar | ..................... 290/42 |
| 4,781,023 | A * | 11/1988 | Gordon | ....................... 60/506 |
| 4,931,662 | A * | 6/1990 | Burton | ......................... 290/42 |
| 5,132,550 | A * | 7/1992 | McCabe | ...................... 290/53 |
| 5,708,305 | A * | 1/1998 | Wolfe | ........................... 290/53 |
| 6,681,572 | B2 * | 1/2004 | Flory | ........................... 60/507 |

* cited by examiner

*Primary Examiner*—Nicholas Ponomarenko

(57) ABSTRACT

Disclosed is a wave powered electric generating device for generating electric power from wave-driven water body in a fast, easy, inexpensive, and efficient manner such that the set up has less configurational complexity, involves easy installation and maintainability. The wave powered electric generating device comprises: a plurality of buoyant members capable of floating in a wave-driven water body, wherein one of the buoyant members comprises at least one electric generator, and a transmission system; and interconnecting mechanism for connecting the buoyant members, wherein the transmission system is configured to convert a wave motion of the wave-driven water body to a rotary motion, the transmission system is capable of transmitting the rotary motion to the electric generator for producing electric power.

12 Claims, 13 Drawing Sheets

WAVE POWERED ELECTRIC GENERATING DEVICE

CROSS REFERENCE TO RELATED APPLICATION

This patent application is related to the U.S. patent application Ser. No. 60/662,582 dated Mar. 18, 2005 titled "Floating Wave Powered Electric Generating Device" and assigned to the assignee of the present invention.

FIELD OF THE INVENTION

The present invention relates to a floating, wave powered electric generating device.

BACKGROUND OF THE INVENTION

Waves are a powerful source of energy. Waves are caused by the wind as it blows across a water body. When this wind skims over the water body, an interaction is caused in which energy is exchanged between the wind and the surface of the water body. Initially ripples arise on the surface and then, the wind that skims along these ripples causes higher air pressure at the front of the wave than at the back. As a result, the ripples change into small waves. As this process continues, the waves become higher.

Wave power plants are built to extract the wave energy and convert it into useful electric power. Some of the advantages of generating electricity from wave movements are: firstly, the energy extracted is free without utilizing any fuel, secondly, waves can produce a great deal of energy since wave power is renewable, and thirdly, wave power plants are easy and inexpensive to operate and maintain, when compared to other sources such as, nuclear power, solar power, and the like. However, the problem is that it is not easy to harness the wave energy and convert it into electrical energy in large amounts. Thus, wave power stations are rare.

Several attempts have been made in the past to build devices for generating electric power from waves. For Example, U.S. Pat. No. 4,098,084 discloses an apparatus for generating energy from movement of water, particularly sea waves. The disclosed apparatus comprises a plurality of buoyant members interconnected to one another so as to be movable relative to one another. Each buoyant member is provided with a plate or plate like member. The apparatus is submerged below the level of the water, and means are provided for converting the relative movement of the buoyant members into useful electrical energy. However, the problem associated with the disclosed apparatus is that the buoyant members may flip over the other in large waves. This is because larger waves that pass over the end of the buoyant member would continue to lift the buoyant member. Another problem associated with the disclosed apparatus is the associated high torque low rpm.

U.S. Pat. No. 4,319,454 discloses a wave action power plant—driven by the action waves and having a drive shaft rotated by a plurality of drive units. The drive units have a lever pivotally mounted on and extending said shaft and carrying a weight, in the form of float, which floats on the waves and rocks the lever up and down on the shaft. A ratchet mechanism causes said shaft to be rotated in one direction by the weight of the float after it has been raised by wave and the wave has passed, leaving said float free to move downwardly by gravity and apply it full weight to pull down on the lever and rotate the drive shaft. The large number of drive units ensures that there are always some of the weights pulling down on their respective levers while other weights are being lifted by waves and thereby causing continuous rotation of the drive shaft in one direction. The said levers are so mounted that they may be easily raised to bring the weights into a position wherein they are readily accessible for cleaning the bottoms thereof to remove any accumulation of barnacles, mollusks, and the like. The disclosed wave power plant is also provided with means for preventing the weights from colliding with each other as they independently move up and down on the waves. However, it may not be desirable to use weights on the floats, since some power may be wasted in order to lift the float.

Accordingly what is needed is a way to generate electric power from wave-driven water body in a fast, easy, inexpensive, and efficient manner such that the set up has less configurational complexity, involves easy set up and maintainability.

SUMMARY OF THE INVENTION

In view of the foregoing disadvantages inherent in the prior arts, the general purpose of the present invention is to provide an apparatus for generating electricity from a wave driven water body by converting the energy from the wave motion of the waves to electrical energy and to include all the advantages of the prior art, and to overcome the drawbacks inherent therein.

In one aspect, the present invention provides a wave powered electric generating device comprising: a plurality of buoyant members capable of floating in a wave-driven water body, wherein one of the buoyant members comprises at least one electric generator, and a transmission system; and interconnecting mechanism for connecting the buoyant members, wherein the transmission system configured to convert a wave motion of the wave-driven water body to a rotary motion, the transmission system capable of transmitting the rotary motion to the electric generator for producing electric power.

In another aspect, the present invention provides a floating wave powered electric generating device comprising: a first buoyant member, a second buoyant member, a third buoyant member placed intermediate to the first buoyant member and the second buoyant member, a first interconnector configured to pivotally attach the third buoyant member to the first buoyant member, and a second interconnector configured to rigidly attach the third buoyant member to the second buoyant member. The first buoyant member, the second buoyant member, and the third buoyant member operably floating along a wave motion of a wave-driven water body, the third buoyant member comprises a primary shaft disposed along a longitudinal axis of the third buoyant member, a secondary shaft disposed adjacently and parallel along the longitudinal axis of the third buoyant member, the secondary shaft operably coupled to the primary shaft, a large drive gear mounted on the primary shaft and configured to rotate integrally with the primary shaft, a first small gear mounted on the secondary shaft, the first small gear capable of meshing with the large drive gear, the first small gear configured to transmit a rotary motion of the primary shaft to the secondary shaft, in such a manner, that a direction of rotation of the first small gear is opposite to a direction of rotation of the large drive gear, a reversing gear capable of meshing with the large drive gear, a second small gear mounted on the secondary shaft, the second small gear capable of meshing with the reversing gear, the second small gear in mesh with the reversing gear configured to transmit a rotary motion of the primary shaft to the secondary shaft, in such a manner, that a direction of rotation of the second small gear is same as a direction of rotation of the large drive gear, and a driving mechanism for transmitting the rotary motion of the secondary shaft to a electric generator, the electric generator is capable of generating electric power from the rotary motion transmitted to the electric generator.

In yet another aspect, the present invention provides a floating wave powered electric generating device comprising: a first buoyant member; a second buoyant member, and a third buoyant member placed intermediate to the first buoyant member and the second buoyant member; a first interconnector configured to pivotally attach the third buoyant member to the first buoyant member, and a second interconnector configured to rigidly attach the third buoyant member to the second buoyant member, wherein the first buoyant member, the second buoyant member, and the third buoyant member operably floating along a wave motion of a wave-driven water body, the third buoyant member comprises a primary shaft disposed along a longitudinal axis of the third buoyant member, a secondary shaft disposed adjacently and parallel along the longitudinal axis of the third buoyant member, the secondary shaft operably coupled to the primary shaft, a large double sprocket mounted on the primary shaft and configured to rotate integrally with the primary shaft, a first small sprocket mounted on the secondary shaft, the first small sprocket capable of coupling with the large double sprocket through a first chain, the first small sprocket configured to transmit a rotary motion of the primary shaft to the secondary shaft, in such a manner, that a direction of rotation of the first small sprocket is same as a direction of rotation of the large double sprocket, a second small sprocket mounted on the secondary shaft and coupled to the large double sprocket through a second chain along a pair of idler rollers, the second small sprocket is configured to transmit a rotary motion of the primary shaft to the secondary shaft, in such a manner, that a direction of rotation of the second small sprocket is opposite to a direction of rotation of the large double sprocket, and a driving mechanism for transmitting the rotary motion of the secondary shaft to a electric generator, the electric generator is capable of generating electric power from the rotary motion transmitted to said electric generator.

These together with other aspects of the present invention, along with the various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated exemplary embodiments of the present invention.

BRIEF DESCRIPTION OF THE DRAWINGS

The advantages and features of the present invention will become better understood with reference to the following more detailed description and claims taken in conjunction with the accompanying drawings, wherein like elements are identified with like symbols, and in which:

Like reference numerals refer to like parts throughout the description of several views of the drawings.

DETAILED DESCRIPTION OF THE INVENTION

The exemplary embodiments described herein detail for illustrative purposes are subject to many variations in structure and design. It should be emphasized, however, that the present invention is not limited to a particular floating wave powered electric generating device, as shown and described. It is understood that various omissions, substitutions of equivalents are contemplated as circumstances may suggest or render expedient, but is intended to cover the application or implementation without departing from the spirit or scope of the claims of the present invention.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

The present invention provides a device for generating electricity in a fast, easy, convenient and inexpensive manner. The device of the present invention uses the up and down motion of the waves in a wave-driven water body (for e.g. ocean waves) and extracts energy from the wave movement to generate electric power i.e. mechanical energy of the components of the device of the present invention caused by the motion of the waves is converted to the electrical energy.

The present invention provides a floating wave powered electric generating device configured to float on the surface of sea waves, and without any moving parts of the device being exposed to the saline water, or other materials that are capable of causing damage to the components therewithin. Another advantage is the ability of the floating wav powered electric generating device is to operate in the wave-driven water body without utilizing water driven turbines. The present invention also protects the floating wave powered electric generating device from being flooded and sinking to the bottom of the wave-driven water body during storms by providing means to bring back the device to the surface of the water body.

Figure 1:
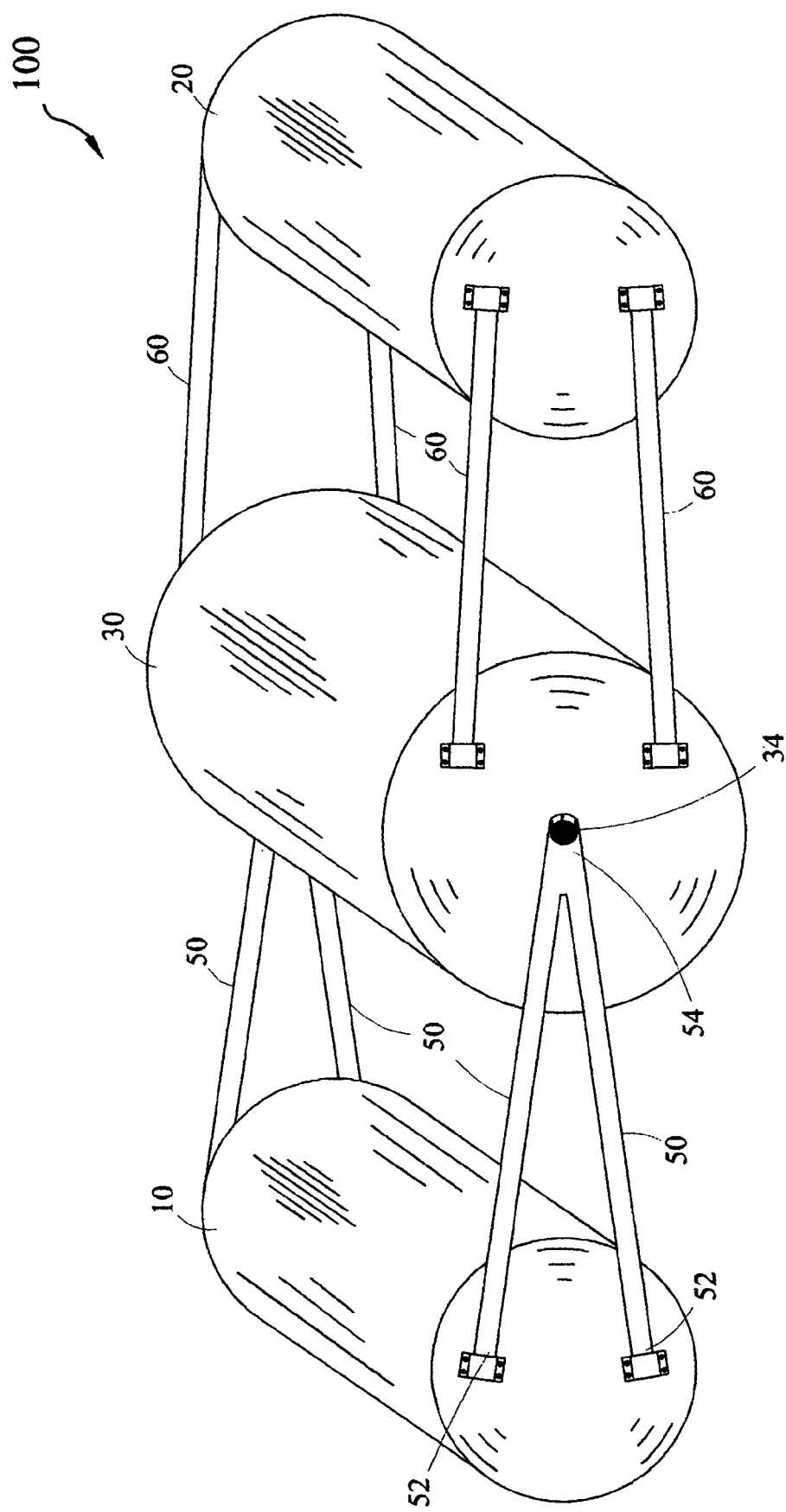
FIG. 1 is a perspective view of a floating wave powered electric generating device 100, according to an exemplary embodiment of the present invention.

FIG. 1 illustrates a floating wave powered electric generating device 100 (hereinafter referred to as device 100). The device 100 comprises a plurality of buoyant members including a first buoyant member 10, a second buoyant member 20, a third buoyant member 30, a first interconnector 50 and a pair of second interconnectors 60. The buoyant members are capable of floating on the surface of a wave-driven water body, for example, ocean, river and the like. The buoyant members may take form of a closed hollow cylindrical configuration, for example, a barrel shaped pontoon constructed from a metal, concrete, or similar material. The buoyant members are spaced parallel to each other. The third buoyant member 30 is positioned between the two outer buoyant members (the first buoyant member 10 and the second buoyant member 20), such that, the third buoyant member 30 is centrally located. In one embodiment, the first buoyant member 10 and the second buoyant member 20 are substantially similar and may be interchanged. The first buoyant member 10 and the second buoyant member 20 are spaced apart, such that, the distance between them may be substantially same as the distance between two crests of a wave. The first buoyant member 10 and the second buoyant member 20 may be half-filled with water to have lift, and at the same time weight to force them back down between waves.

In one embodiment, in order to improve the efficiency of the operation of the device 100, the weight of the device 100 is distributed, such that, the total weight of the first buoyant member 10 and the second buoyant member 20 is half the weight of the third buoyant member 30. For example, if the third buoyant member 30 has a weight of 1,000 pounds (lbs), then it is preferred to have buoyancy twice its weight, that is, 2000 lbs for the third buoyant member 30. In such cases, it is also preferred that each of the outer buoyant members (i.e. the first buoyant member 10 and the second buoyant member 20) weigh 500 lbs with a buoyancy of 1000 lbs each.

Figure 2:
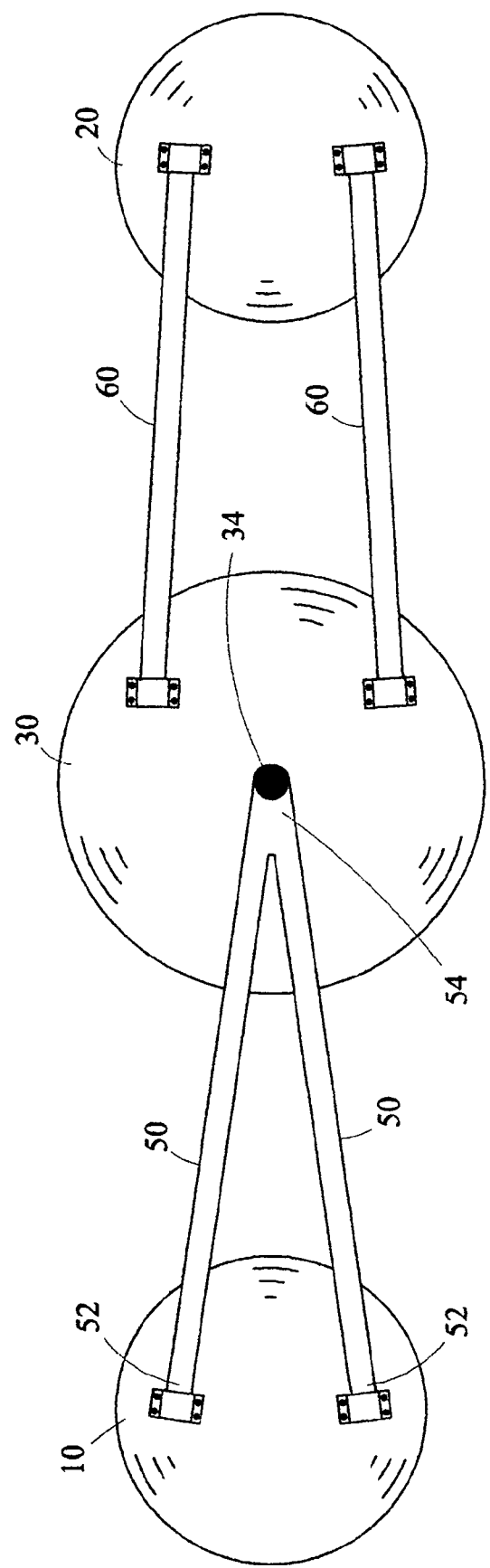
FIG. 2 is a side view of the floating wave powered electric generating device 100, according to an exemplary embodiment of the present invention.
Figure 3:
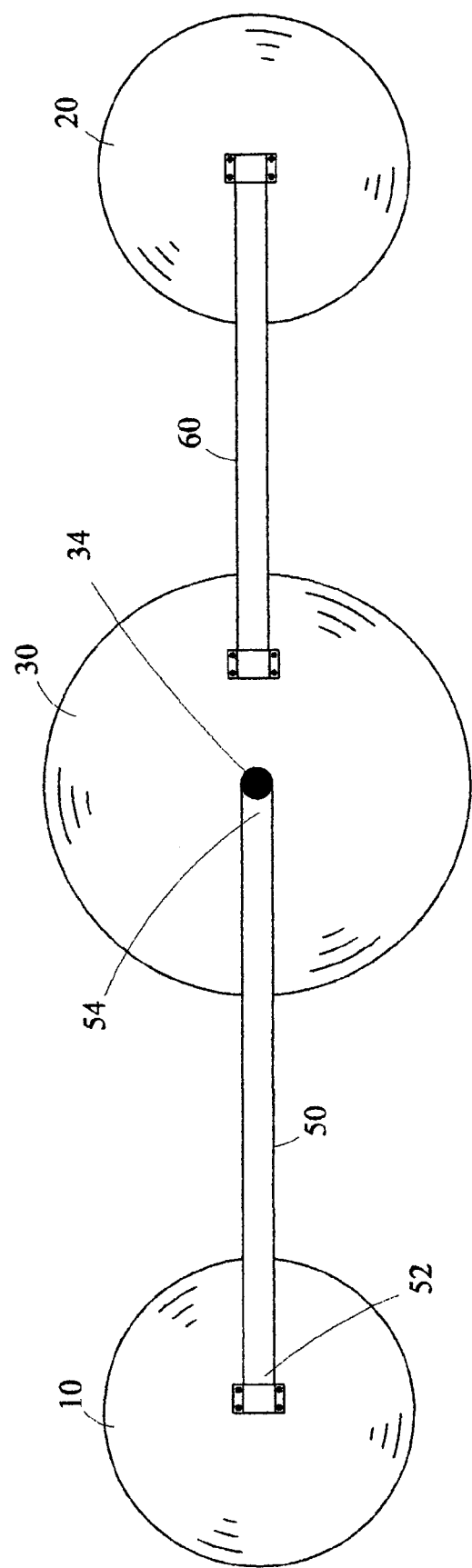
FIG. 3 is another side view of a floating wave powered electric generating device 100, according to another embodiment of the present invention.

Referring to FIG. 2-3, the side view of the floating, wave powered electric generating device 100, is shown. The third buoyant member 30 is connected to the first buoyant member 10 through a first interconnector 50, and the second buoyant member 20 is connected to the third buoyant member 30 through second interconnectors 60. The third buoyant member 30 further has a primary shaft 34 running centrally through a longitudinal axis of the third buoyant member 30 and having ends protruding from the third buoyant member 30. The first interconnector 50 may take the form of a crank having a pair of arms pivotally connecting the first buoyant member 10 with the third buoyant member 30. The crank arms are rigidly coupled to the first buoyant member 10 at first ends 52 using known coupling means, and at the second end 54 pivotally coupled to the protruding end of the primary shaft 34 of the third buoyant member 30. (See FIG. 2). The second interconnector 60, for example, a pair of ridged connecting rails, at both ends, rigidly connects the third buoyant member 30 with the second buoyant member 20 (See FIG. 2). The pivotal connection of the first buoyant member 10 with the third buoyant member 30 using the first interconnector 50 enables a pivotal movement of the first buoyant member 10 at the primary shaft 34 and the rigid connection of the second buoyant member 20 with the third buoyant member 30 using the second interconnector 60 causes the movement of the second buoyant member 20 and third buoyant member 30 conjointly. For example, the motion of waves may cause the first buoyant member 10 to move up and down, enabling the primary shaft 34 to rotate in both clockwise and counter-clockwise direction intermittently. In one embodiment, the device 100 may also be configured with a first interconnector 50 taking the form of a crank having a single arm pivotally connecting the third buoyant member 30 with the first buoyant member 10 and the second interconnector 60 taking the form of a single ridged connecting rail rigidly connecting the third buoyant member 30 with the second buoyant member 20 (See FIG. 3).

Figure 4A:
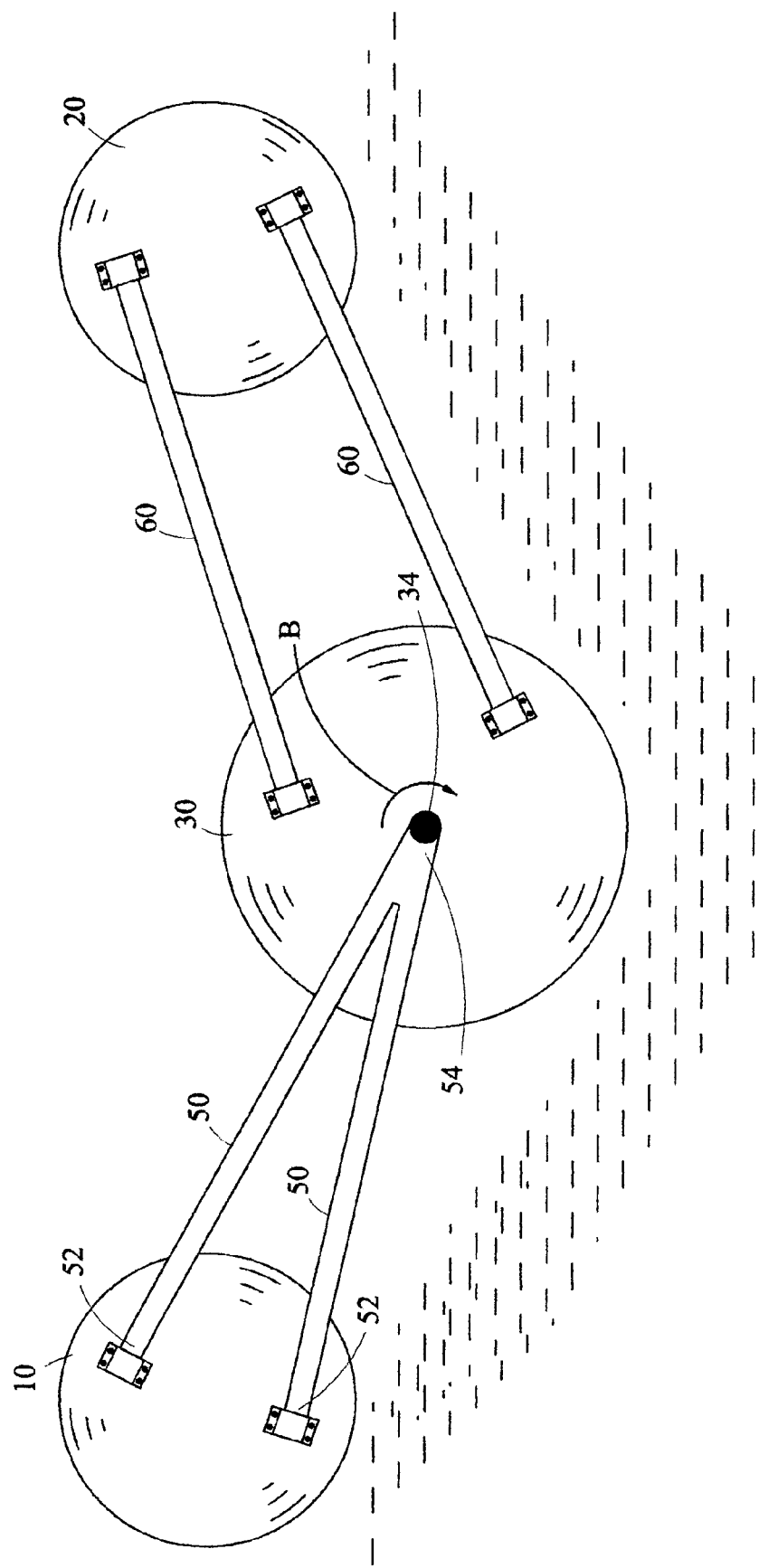
FIG. 4A is a side view of the floating wave powered electric generating device 100, positioned on the surface of a wave-driven water body with a crest and two troughs, according to another exemplary embodiment of the present invention.
Figure 4B:
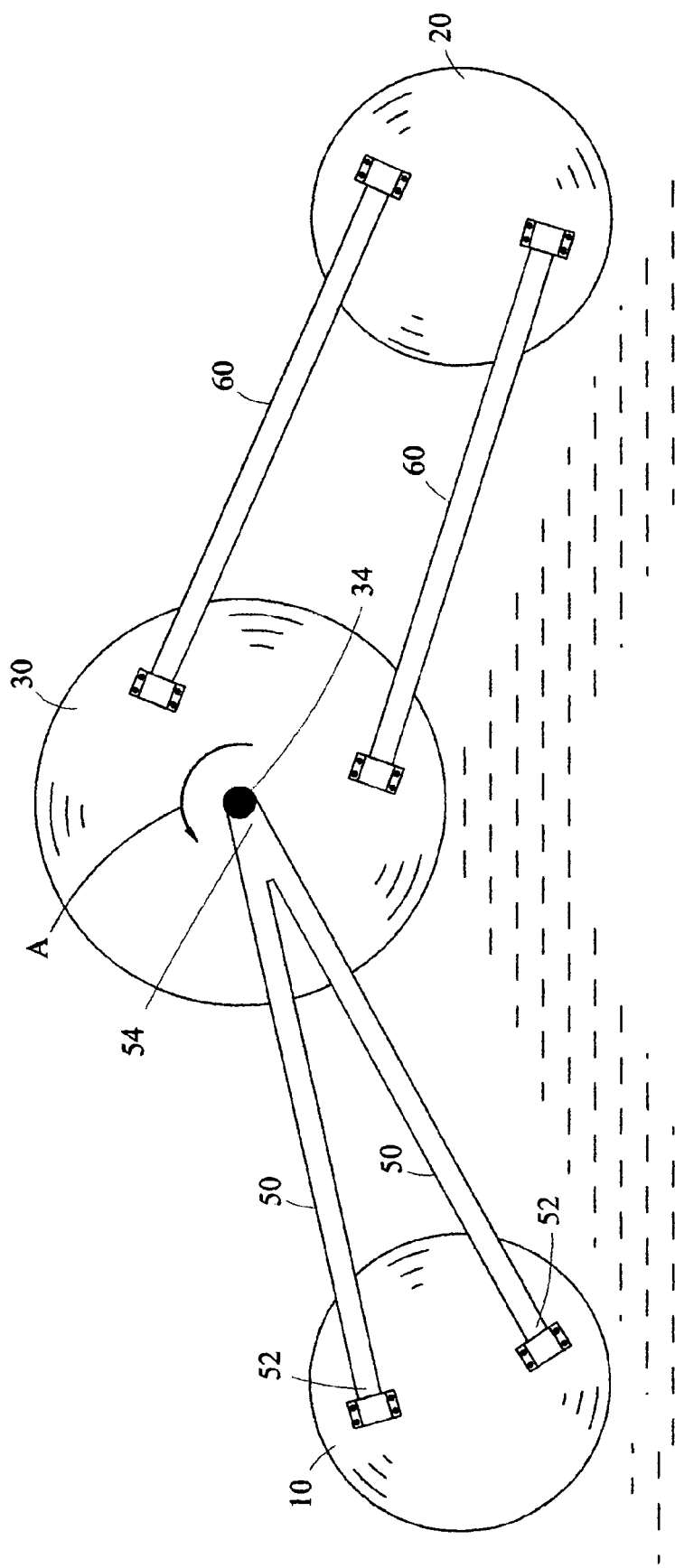
FIG. 4B is a side view of the floating wave powered electric generating device 100, positioned on a surface of the wave-driven water body with two crests and a trough, according to an exemplary embodiment of the present invention.

Now referring to FIGS. 4A-4B, the floating wave powered electric generating device 100 positioned on the surface of the wave-driven water body, is shown. The motion of the waves causes the buoyant members to move up and down along the waves. In one scenario, the third buoyant member 30 is raised to the top of the wave (wave crest), such that the first buoyant member 10 and the second buoyant member 20 are in the valley (wave trough) of the wave (See FIG. 4A). The buoyancy of the third buoyant member 30 causes the third buoyant member 30 to stay at the wave crest, while the weight of the first buoyant member 10 and the second buoyant member 20 causes them to stay at the wave troughs. The weight of the two outer buoyant members (i.e. the first buoyant member 10 and the second buoyant member 20) forces the primary shaft 34 to rotate in a counter-clockwise direction 'A'. Alternatively, the two outer buoyant members (i.e. the first buoyant member 10 and the second buoyant member 20
) are raised to the wave crest, such that, the third buoyant member 30 is placed at the wave trough. (See FIG. 4B). The buoyancy of the two outer buoyant members (i.e. the first buoyant member 10 and the second buoyant member 20) causes them to stay at the wave crest, while the weight of the third buoyant member 30 forces the primary shaft 34 to rotate in a clockwise direction 'B'.

The outer buoyant members (i.e. the first buoyant member 10 and second buoyant member 20) and a portion of the third buoyant member 30 may have a valve (not shown) to flood the device 100 (in order to sink the device 100) to the bottom of the wave-driven water body during storms. The valve may be controlled remotely through a cable (not shown) strung along the power cables. An air hose (not shown) may be used to fill the buoyant members with air for returning the device 100 to the surface of the wave-driven water body. An anchoring structure (not shown) may be used to hold the device 100 in place while floating on the water-driven water body. A connecting means, such as, a cable, or a rope, or a chain, or a combination thereof, may be used to connect the anchoring structure to the device 100.

Figure 5A:
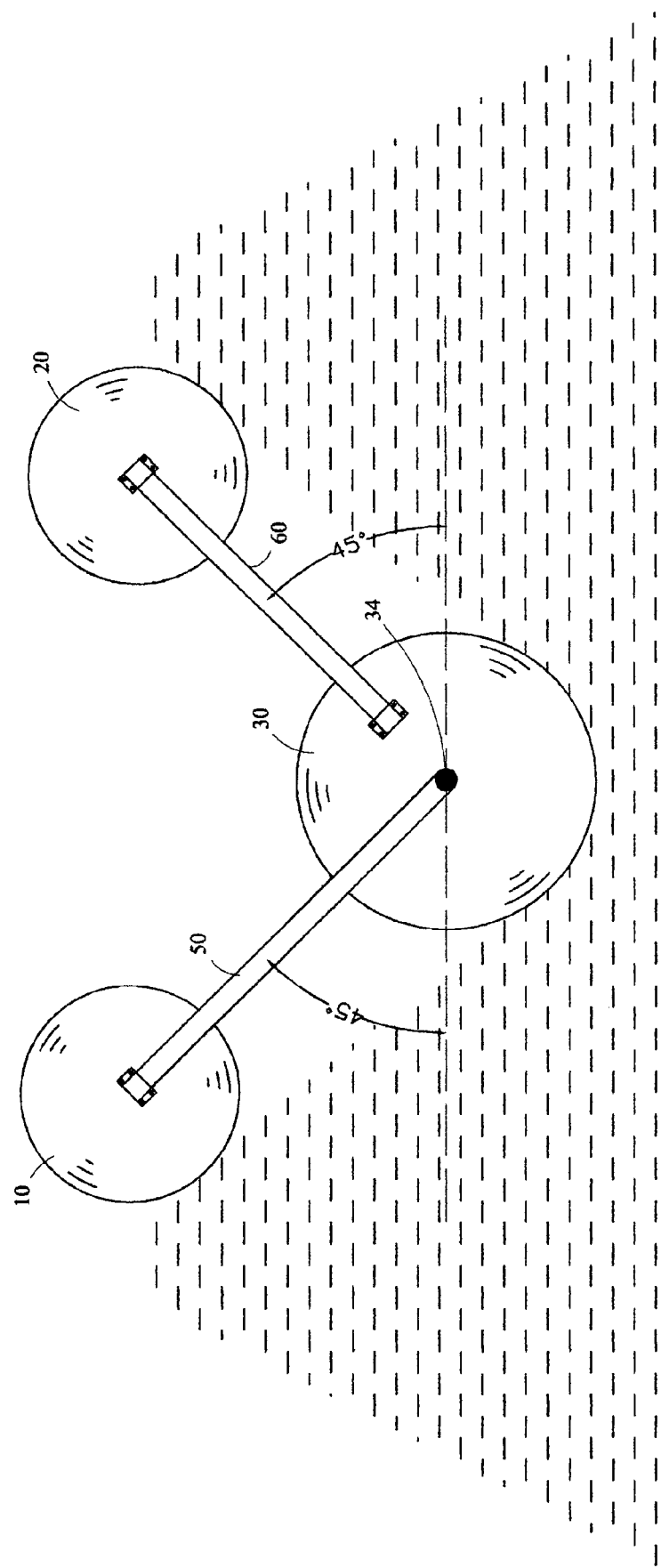
FIGS. 5A and 5B illustrate the degree of rotation generated by the up and down movement of the buoyant members on the wave-driven water body.
Figure 5B:
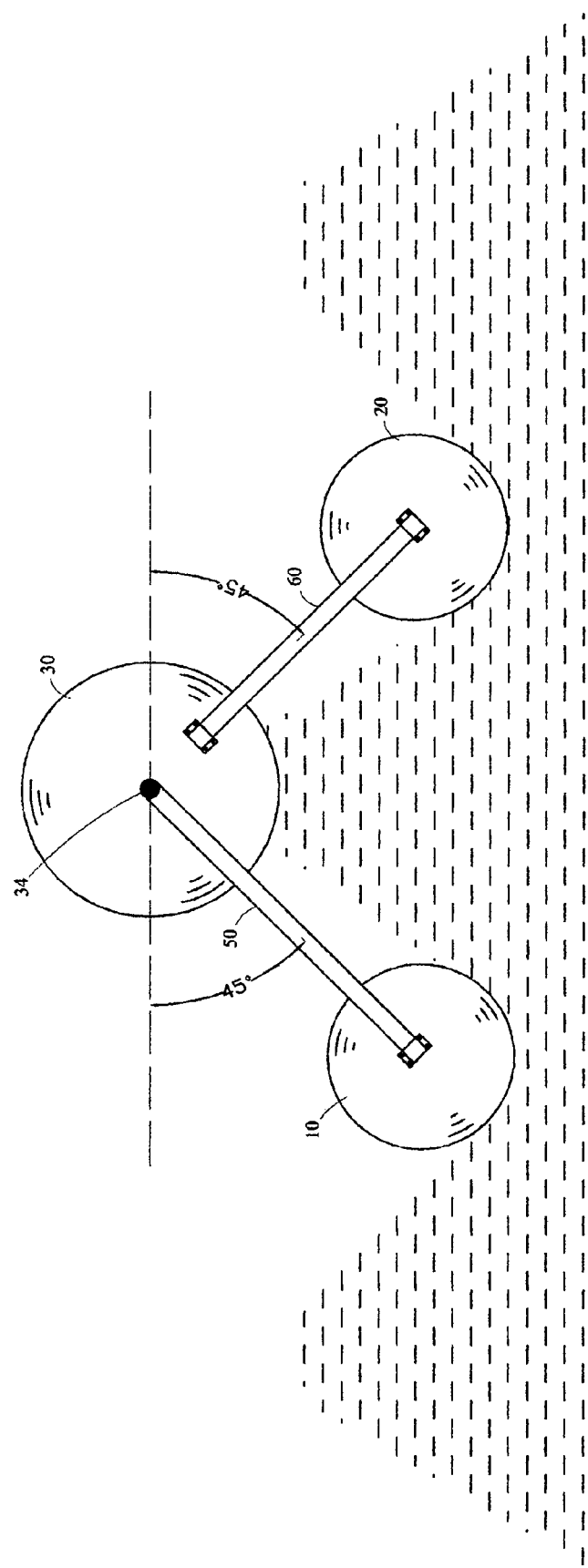

Now, referring to FIGS. 5A and 5B, illustrated is degree of rotation generated by the up and down movement of the buoyant members on the wave-driven water body. When the second buoyant member 20 moves from about 45 degrees above the third buoyant member 30, to 45 degrees below, the primary shaft 34 rotates 90 degrees in the clockwise direction. Simultaneously, the first buoyant member 10 moves from 45 degrees above the third buoyant member 30, to 45 degrees below, the primary shaft 34 rotates 90 degrees in the counter-clockwise direction. The total rotation of the primary shaft 34 equals 180 degrees or one-half turn (See FIG. 5A). When the wave moves back to its starting position with the outer buoyant members (first buoyant member 10 and second buoyant member 20) at the wave crest, the primary shaft 34 rotates another 180 degrees or one-half turn (See FIG. 5B). This means that, up to one rpm per wave may be produced. The maximum horse power unit of the device 100 may be calculated by multiplying the total rpm with torque and then dividing by 5252. The torque is the weight of the outer buoyant members (first buoyant member 10 or the second buoyant member 20) multiplied by the total length of the first interconnector 50 or the second interconnector 60.

For example, if the number of waves is 10, weight of the outer buoyant members is 15,000 lbs, and total length of the first interconnector 50 or the second interconnector 60 are 20 feet, then horse power may be calculated as follows: Ten waves per minute equals 10 Revolutions Per Minute (RPMs). Torque=15000×20=300,000 foots pounds torque. Horse Power=10 RPMs×300,000 lbs torque/5252. Maximum Horse Power=571 hp. Assuming that, horse power is 335 hp. One hp equals 746 watts. Therefore, power generated=335 hp×746=250,000 watts=¼ megawatt.

Figure 6:
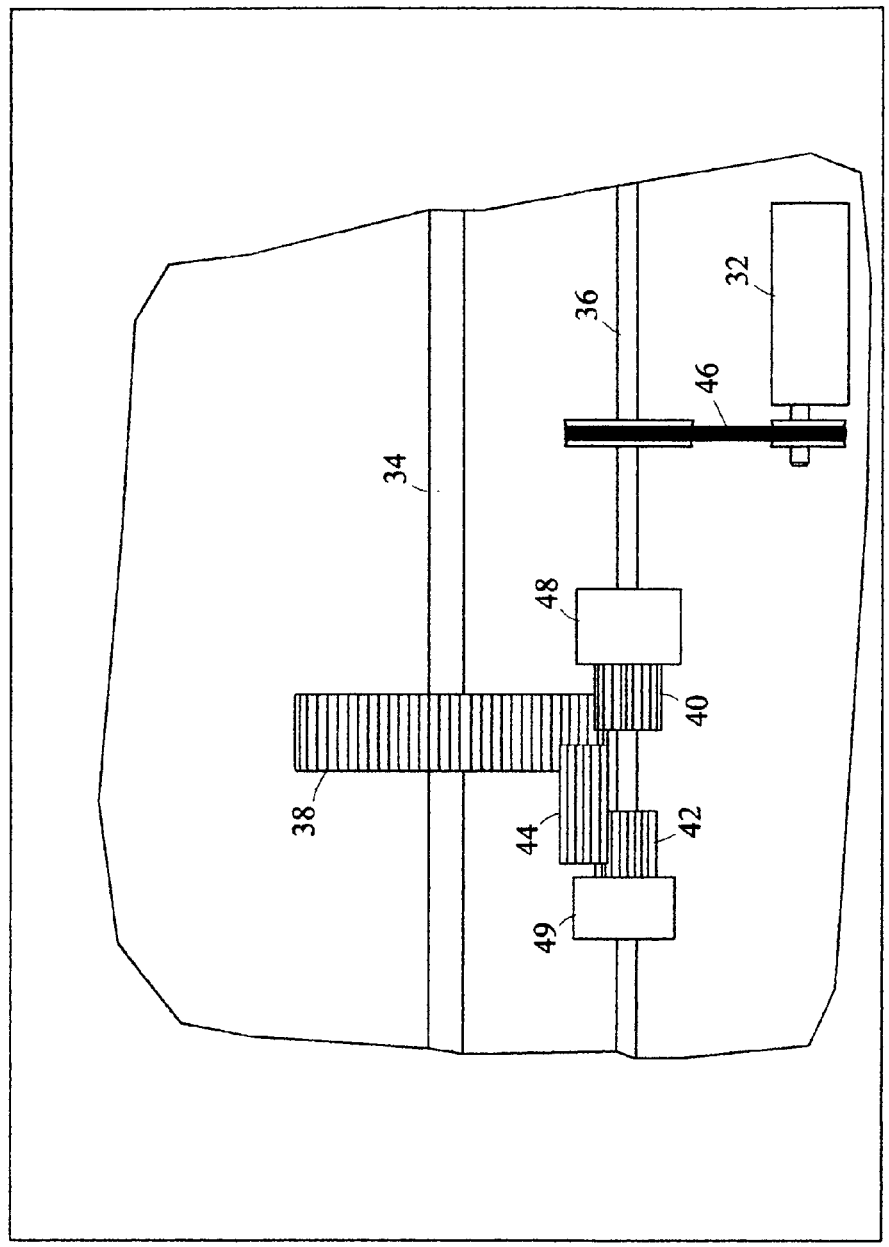
FIG. 6 is a top cutaway view of a third buoyant member 30, according to an exemplary embodiment of the present invention.
Figure 7:
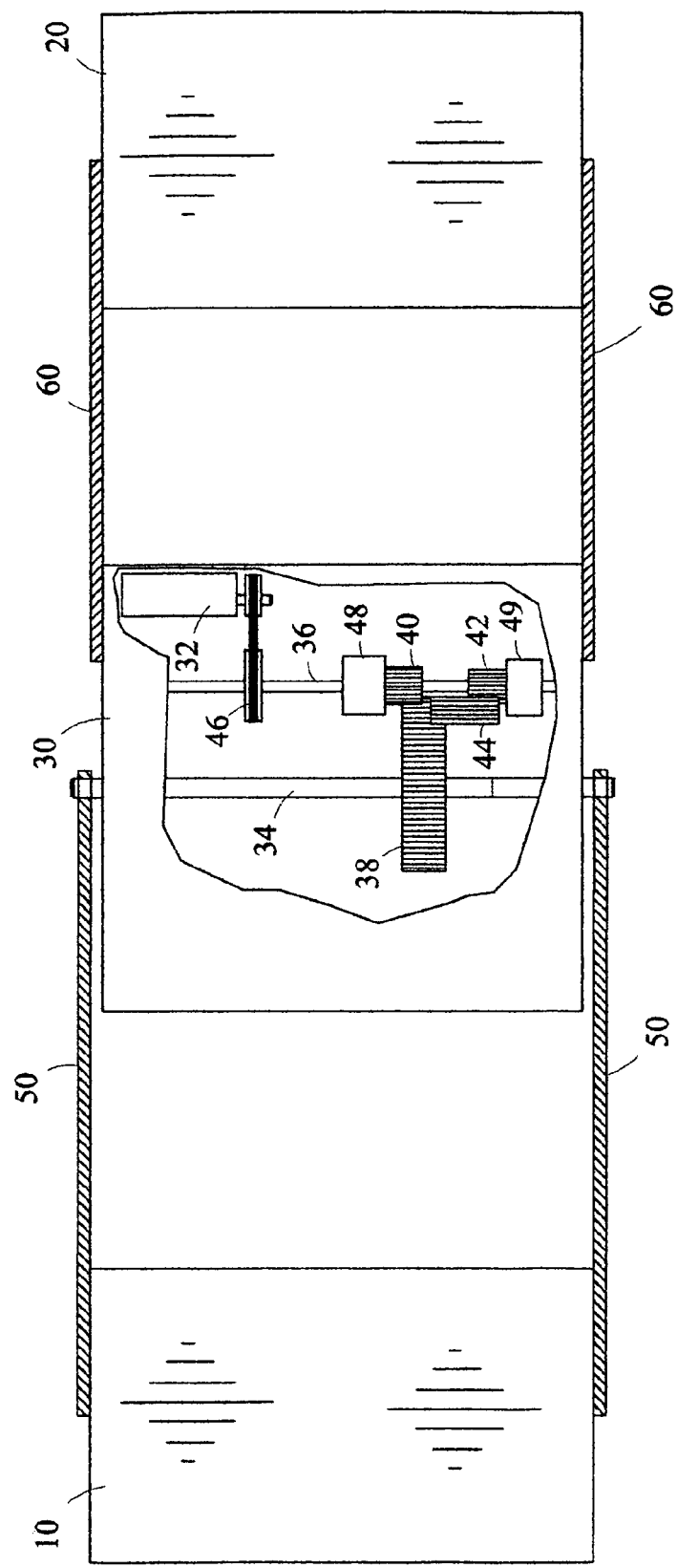
FIG. 7 is another top cutaway view of the third buoyant member 30 of the floating wave powered electric generating device 100, according to an exemplary embodiment of the present invention.

Now referring to FIGS. 6 and 7, the third buoyant member 30 comprises an electric generator 32, the primary shaft 34, and a secondary shaft 36. The protruding ends of the primary shaft 34 are held by bearings on each end of the third buoyant member 30. Flexible boots (not shown) may be used to protect the bearings from the water. The secondary shaft 36 is connected to the electric generator 32 through driving mechanism 46 that may adjust shaft speeds to the electric generator 32. The driving mechanism 46 includes, but is not limited to, belt, chain, or gears. In one embodiment, the electric generator 32 is directly coupled to the secondary shaft 36.

The third buoyant member 30 further has a large drive gear 38 mounted on the primary shaft 34 and configured to rotate integrally with the primary shaft 34. As the wave on the water body moves the buoyant members up and down, the large drive gear 38 attached to the primary shaft 34 spins back and forth. The secondary shaft 36 is disposed adjacently and parallel to the primary shaft 34 along the longitudinal axis of the third buoyant member 30. A first small gear 40 mounted on the secondary shaft 36 is capable of meshing with the large drive gear 38 and configured to transmit the rotation of the primary shaft 34 to the secondary shaft 36 in such a manner that the direction of rotation of the first small gear 40 and in turn the secondary shaft 36 is always opposite to the large drive gear 38 and in turn the primary shaft 34. The secondary shaft 36 further has a second small gear 42 mounted concentrically on the secondary shaft 36 and in mesh with a reversing gear 44. The reversing gear 44 is capable of meshing with the large drive gear 38 and configured to transmit the rotation of the primary shaft 34 to the secondary shaft 36 in such a manner that the direction of rotation of the reversing gear 44 is always opposite to the direction of rotation of the large drive gear 38 an in turn the primary shaft 34. As the reversing gear 44 is in mesh with the second small gear 42, the direction of rotation of the second small gear 42 is opposite to the direction of rotation of the reversing gear 44 leading to the direction of rotation of the second small gear 42 in the same direction as the rotation of the large drive gear and in turn the primary shaft 34. The secondary shaft 36 further comprises a pair one way clutch configured to engage or disengage the first small gear 40 with the large drive gear 38 and the reversing gear 44 with the large drive gear 38. The reversing gear 44 thereby ensures that the secondary shaft 36 rotates in the same direction irrespective of the direction of rotation of the primary shaft 34. In one embodiment, a pair of large drive gears is mounted on the primary shaft 34, such that, first small gear 40 meshes with one of the large drive gears while the second small gear 42 meshes with the other large drive gear through the reversing gear 44. The mechanical energy of the rotation of the secondary shaft 36 is transmitted to a shaft (not shown) of the electric generator 32, capable of generating electric power which is transmitted to a base station using power cables.

Figure 8A:
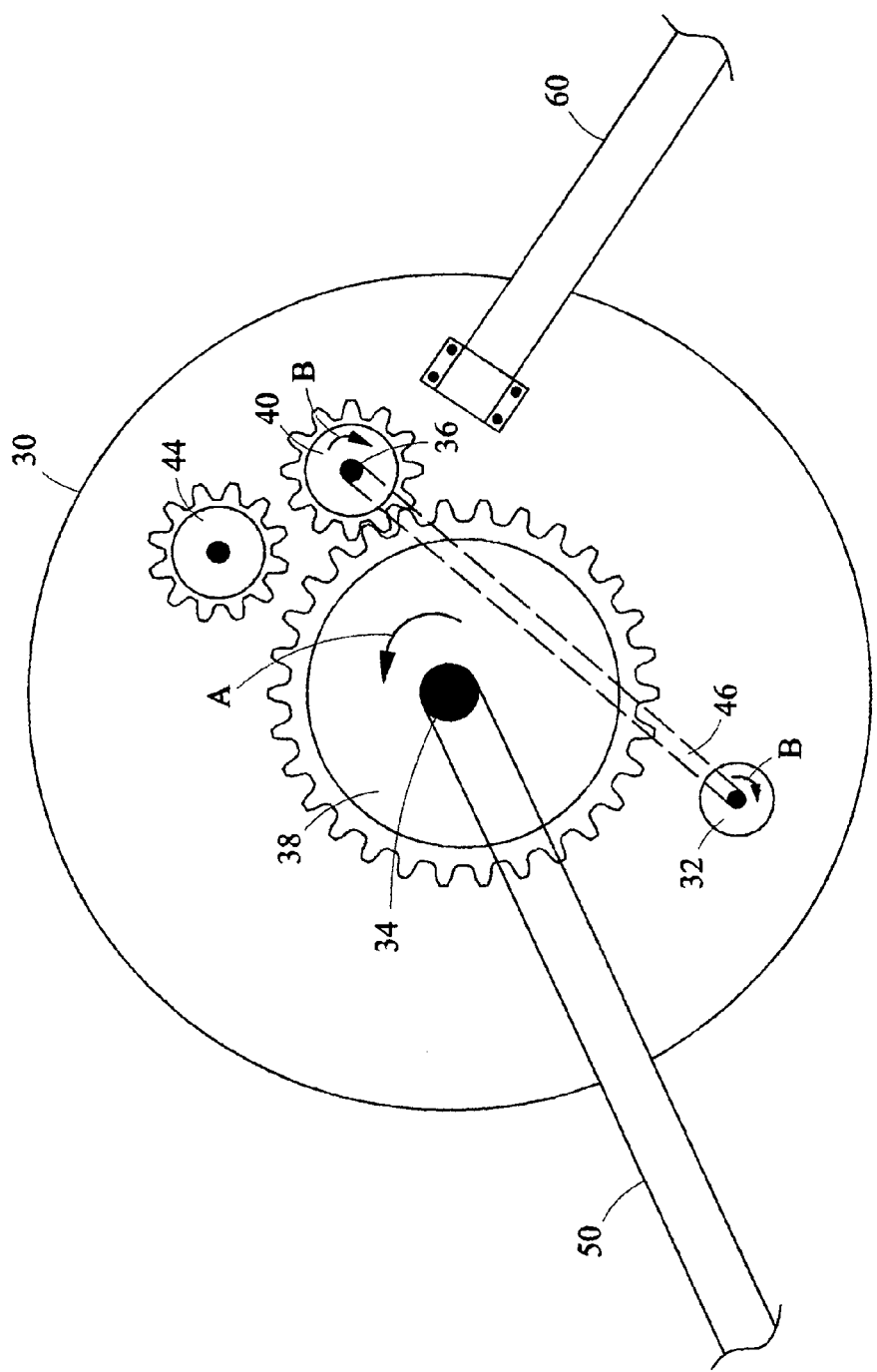
FIGS. 8A and 8B illustrates a side sectional view of the floating wave powered electric generating device 100, illustrating the transmission system and the axis of rotation of a primary shaft of within a third buoyant member 30, according to another exemplary embodiment of the present invention.

The wave powered electric generating device 100 may be operated to generate electric power either by a clockwise rotation or a counter-clockwise rotation of the shaft of the electric generator 32. Now, taking a scenario, wherein the wave powered electric generating device 100 is operated to generate power by the clockwise rotation of the shaft of the electric generator 32 is desired. Referring to FIG. 8A, shown is a transmission system within a third buoyant member 30 illustrating the direction of rotation of the primary shaft 34 and the secondary shaft 36. When a wave moves the third buoyant member 30 to the wave crest, causing the first buoyant member 10 and the second buoyant member 20 to be positioned in the wave trough, such that the primary shaft 34 and in turn the large drive gear 38 rotates in the counterclockwise direction 'A'. The first one way clutch 48 (See FIG. 7) engages the first small gear 40 to the large drive gear 38, which causes the secondary shaft 36 to rotate in the clockwise direction 'B'. If the rotation of the secondary shaft 36 is transmitted to the electric generator 32, the shaft of the electric generator 32 also rotates in the clockwise direction 'B'.

Figure 8B:
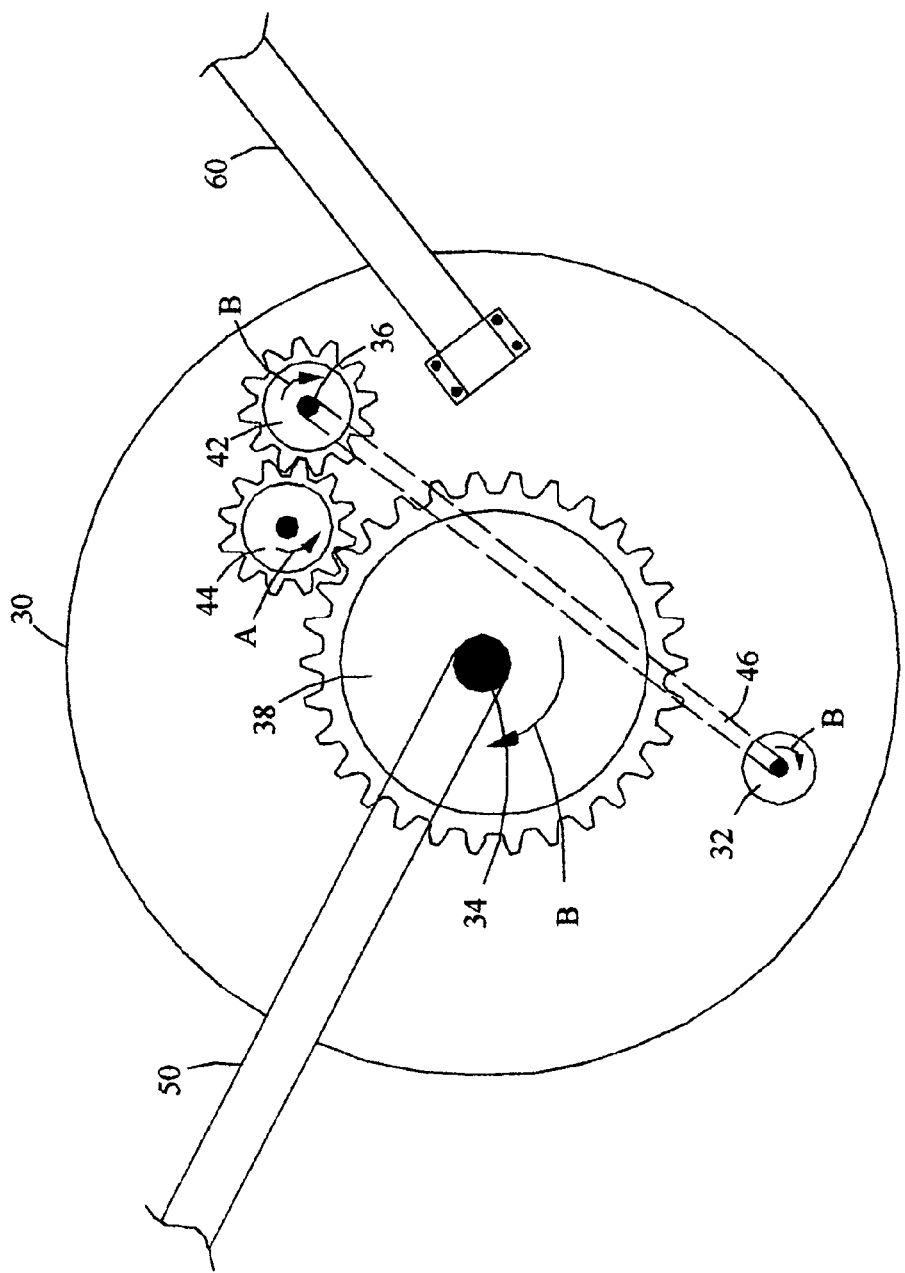

Now, referring to FIG. 8B, when the two outer buoyant members (i.e. the first buoyant member 10 and the second buoyant member 20) are raised to the wave crest, such that, the third buoyant member 30 is placed at the wave trough, such that the primary shaft 34 and in turn the large drive gear 38 rotates in the clockwise direction 'B'. The second one way clutch 49 (See FIG. 7) engages the reversing gear 44 with the large drive gear 38 upon disengaging the first small gear 40 from the large drive gear 38 by the first one way clutch 48. The meshing of the reversing gear 44 with the large drive gear 38 causes the reversing gear 44 to rotate in a counter-clockwise direction 'A'. As the reversing gear 44 is in mesh with the second small gear 42, the second small gear 42 and in turn the secondary shaft 36 rotates in the clockwise direction 'B' thereby enabling the shaft of the electric generator 32 to rotate in the clockwise direction 'B' as desired. This causes a continuous clockwise rotation of the shaft of the electric generator 32. This continuous rotation of the shaft of the electric generator 32 is used to convert the mechanical/rotational energy of the shaft to electric power by the electric generator 32.

Figure 9:
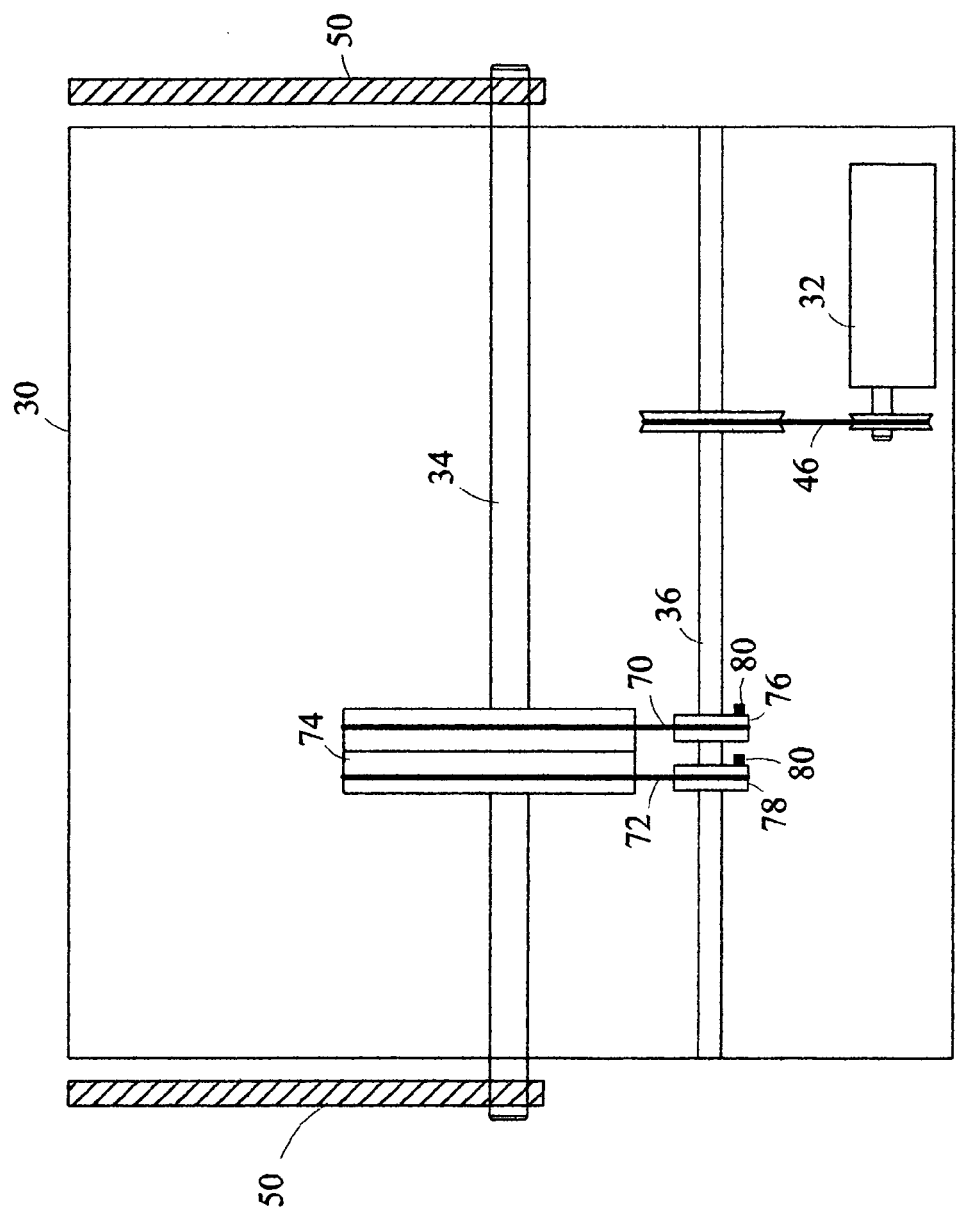
FIG. 9 illustrates the top cutaway view of the floating wave powered electric generating device 100, according to another exemplary embodiment of the present invention.
Figure 10A:
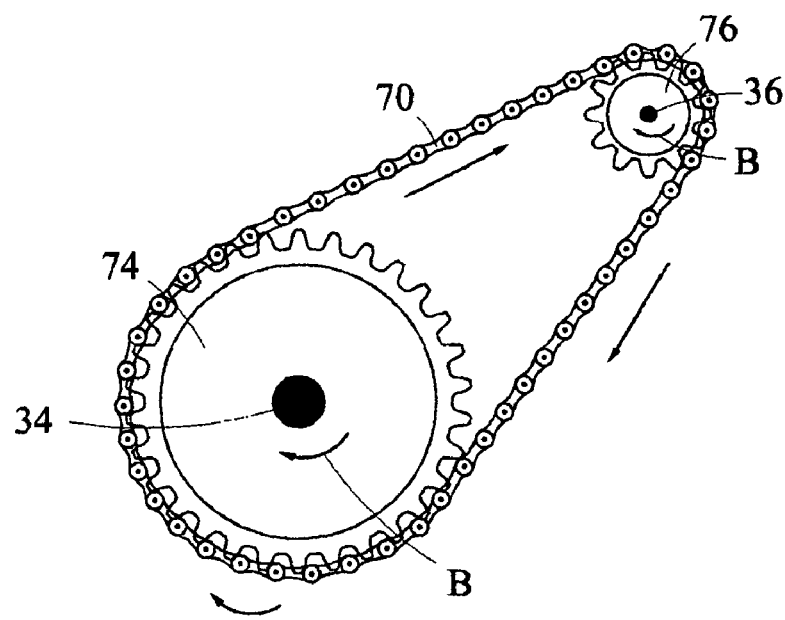
FIGS. 10A and 10B illustrate a chain drive system of the floating wave powered electric generating device 100 for transmission of power to an electric generator, according to an exemplary embodiment of the present invention.
Figure 10B:
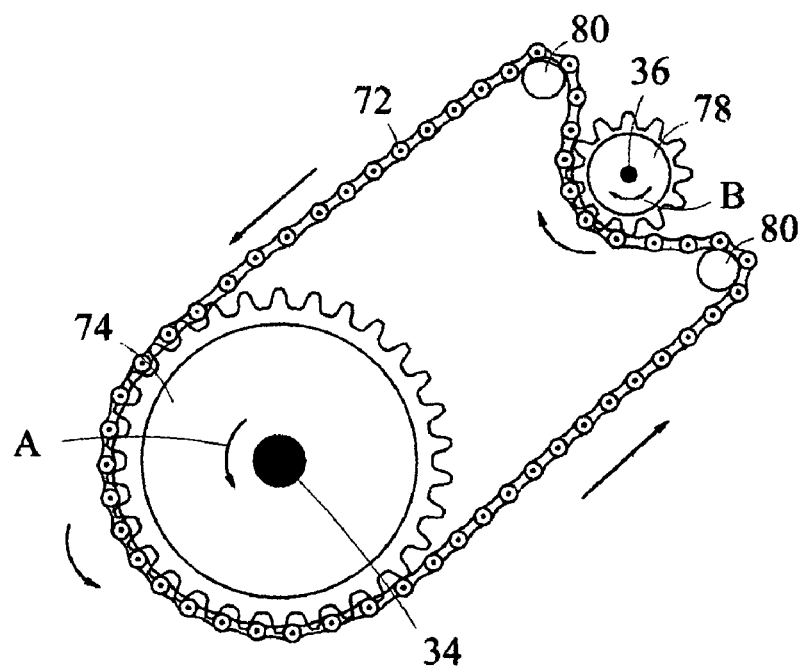

FIGS. 9, 10A and 10B illustrate an embodiment in which the device 100 uses a chain drive system for transmitting the rotation of the primary shaft to the secondary shaft.

Now, particularly referring to FIG. 9, the chain drive system comprises a first chain 70, a second chain 72, a large double sprocket 74, a first small sprocket 76, a second small sprocket 78 and idler rollers 80. The large double sprocket 74 mounted on the primary shaft 34 and configured to rotate integrally with the primary shaft 34. As the wave on the water body moves the buoyant members up and down the large double sprocket 74 mounted on the primary shaft 34 also rotates back and forth. The first small sprocket 76 mounted on the secondary shaft 36 is capable of coupling with the large double sprocket 74 through the first chain 70. The first small sprocket 76 is configured to transmit the rotation of the primary shaft 34 to the secondary shaft 36 in such a manner that the direction of rotation of the first small sprocket 76 and in turn the secondary shaft 36 is the same as the direction of rotation of the large double sprocket 74 and in turn the primary shaft 34. The second small sprocket 78 mounted on the secondary shaft 36 is capable of coupling with the large double sprocket 74 through the second chain 72 and the idler rollers 80 in such a manner that the direction of rotation of the second small sprocket 78 and in turn the secondary shaft 36 is opposite to the direction of rotation of the large double sprocket 74 and in turn the primary shaft 34. The idler rollers 80 thereby ensure that the secondary shaft 36 rotates in the same direction irrespective of the direction of rotation of the primary shaft 34. The mechanical energy of the rotation of the secondary shaft 36 is transmitted to the shaft of the electric generator 32, capable of generating electric power, which is transmitted to the base station using power cables.

The device 100 utilizing the chain drive system may be operated to generate electric power either by a clockwise rotation or a counter-clockwise rotation of the shaft of the electric generator 32. Now, taking a scenario, wherein the device 100 is operated to generate power by the clockwise rotation of the shaft of the electric generator 32 is desired. Now, referring to FIG. 10A, shown is a chain drive system illustrating the direction of rotation of the primary shaft 34 and the secondary shaft 36. When the two outer buoyant members (i.e. the first buoyant member 10 and the second buoyant member 20) are raised to the wave crest, such that, the third buoyant member 30 is placed at the wave trough, causing the primary shaft 34 and in turn the large double sprocket 74 to rotate in the clockwise direction 'B'. The chain drive system further provides a means for engaging the first small sprocket 76 with the large double sprocket 74 through the first chain 70. In one embodiment, the means may include a one way clutch. The first chain 70 coupled with the large double sprocket 74 enables the first small sprocket 76 and in turn the secondary shaft 36 to rotate in the clockwise direction 'B' (which is the direction of rotation of the primary shaft 34). If the rotation of the secondary shaft 36 is transmitted to the electric generator 32, the shaft of the electric generator 32 also rotates in the clockwise direction 'B'.

Referring to FIG. 10B, shown is a chain drive system illustrating the direction of rotation of the primary shaft 34 and the secondary shaft 36. When a wave moves the third buoyant member to the wave crest, causing the first buoyant member 10 and the second buoyant member 20 to be positioned in the wave trough, such that the primary shaft 34 and in turn the large double sprocket 74 rotates in the counter-clockwise direction 'A'. The chain drive system further provides a means for engaging the second small sprocket 78 with the large double sprocket 74 through the second chain 72. In one embodiment, the means may include a one way clutch. The configuration of the idler rollers 80 with the large double sprocket 74 and the second small sprocket 78 through the second chain 72 causes the second small sprocket 78 and in turn the secondary shaft 36 to rotate in the clockwise direction 'B' thereby enabling the shaft of the electric generator 32 to rotate in the clockwise direction 'B'. The second chain 72 coupled with the large double sprocket 74 enables the second small sprocket 78 and in turn the secondary shaft 36 to rotate in the clockwise direction 'B' (which is the direction of rotation of the primary shaft 34). If the rotation of the secondary shaft 36 is transmitted to the electric generator 32, the shaft of the electric generator 32 also rotates in the clockwise direction 'B'. This causes a continuous clockwise rotation of the shaft of the electric generator 32 as desired. This continuous rotation of the shaft of the electric generator 32 is used to convert the mechanical/rotational energy of the shaft to electric power by the electric generator 32.

In one embodiment, a power plant comprising a plurality of buoyant members is operated by interconnecting an array of floating, wave powered electric generating device 100. The power plant may be employed in ocean waves to generate required electric power. The amount of electric power to be generated is determined by the scale of the power plant (i.e. number of devices 100 interconnected together). The generated electric power may be transmitted to the base station using the power cables.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the claims of the present invention.

What is claimed is:

1. A floating wave powered electric generating device comprising:
    a first buoyant member;
    a second buoyant member;
    a third buoyant member placed intermediate to said first buoyant member and said second buoyant member;
    a first interconnector configured to pivotally attach said third buoyant member to said first buoyant member; and
    a second interconnector configured to rigidly attach said third buoyant member to second buoyant member;
    wherein a transmission system comprises:
    a primary shaft;
    a secondary shaft operably coupled to said primary shaft;
    a large drive gear mounted on said primary shaft and configured to rotate integrally with said primary shaft;
    a first small gear mounted on said secondary shaft, said first small gear capable of meshing with said large drive gear, said first small gear configured to transmit said rotary motion of said primary shaft to said secondary shaft, in such a manner that a direction of rotation of said first small gear is opposite to a direction of rotation of said large drive gear;
    a reversing gear capable of meshing with said large drive gear;
    a second small gear mounted on said secondary shaft, said second small gear capable of meshing with said reversing gear, said second small gear in mesh with said reversing gear is configured to transmit a rotary motion of said primary shaft to said secondary shaft, in such a manner that a direction of rotation of said second small gear is same as a direction of rotation of said large drive gear;

a driving mechanism for transmitting said rotary motion of said secondary shaft to said electric generator.

2. The wave powered electric generating device of claim 1, wherein said transmission system further comprises a first one way clutch capable of engaging and disengaging said first small gear with said large drive gear, and a second one way clutch capable of engaging and disengaging said reversing gear with said large drive gear.

3. The wave powered electric generating device of claim 1, wherein said driving mechanism is selected from a group consisting of belt, pulley, chain drive, sprocket, gear drive and a combination of any of the foregoing.

4. A wave powered electric generating device of claim 1, wherein said transmission system comprises
said primary shaft;
said secondary shaft operably coupled to said primary shaft;
a large double sprocket mounted on said primary shaft and configured to rotate integrally with said primary shaft;
a first small sprocket mounted on said secondary shaft, said first small sprocket capable of coupling with said large double sprocket through a first chain, said first small sprocket configured to transmit a rotary motion of said primary shaft to said secondary shaft, in such a manner that a direction of rotation of said first small sprocket is same as a direction of rotation of said large double sprocket;
a second small sprocket mounted on said secondary shaft and coupled to said large double sprocket through a second chain along a pair of idler rollers, said second small sprocket is configured to transmit a rotary motion of said primary shaft to said secondary shaft in such a manner that a direction of rotation of said second small sprocket is opposite to a direction of rotation of said large double sprocket;
driving mechanism for transmitting said rotary motion of said secondary shaft to said electric generator.

5. A floating wave powered electric generating device comprising:
a first buoyant member;
a second buoyant member;
a third buoyant member placed intermediate to said first buoyant member and said second buoyant member;
a first interconnector configured to pivotally attach said third buoyant member to said first buoyant member; and
a second interconnector configured to rigidly attach said third buoyant member to said second buoyant member;
wherein said first buoyant member, said second buoyant member, and said third buoyant member operably floating along a wave motion of a wave-driven water body, said third buoyant member comprises
a primary shaft disposed along a longitudinal axis of said third buoyant member,
a secondary shaft disposed adjacently and parallel along said longitudinal axis of said third buoyant member, said secondary shaft operably coupled to said primary shaft,
a large drive gear mounted on said primary shaft and configured to rotate integrally with said primary shaft,
a first small gear mounted on said secondary shaft, said first small gear capable of meshing with said large drive gear, said first small gear configured to transmit a rotary motion of said primary shaft to said secondary shaft, in such a manner, that a direction of rotation of said first small gear is opposite to a direction of rotation of said large drive gear,
a reversing gear capable of meshing with said large drive gear,
a second small gear mounted on said secondary shaft, said second small gear capable of meshing with said reversing gear, said second small gear in mesh with said reversing gear is configured to transmit a rotary motion of said primary shaft to said secondary shaft, in such a manner, that a direction of rotation of said second small gear is same as a direction of rotation of said large drive gear, and
a driving mechanism for transmitting said rotary motion of said secondary shaft to an electric generator, said electric generator is capable of generating electric power from said rotary motion transmitted to said electric generator.

6. The floating wave powered electric generating device of claim 5, wherein said transmission system further comprises a first one way clutch capable of engaging and disengaging said first small gear with said large drive gear, and a second one way clutch capable of engaging and disengaging said reversing gear with said large drive gear.

7. The floating wave powered electric generating device of claim 5, wherein said driving mechanism is selected from a group consisting of belt, pulley, chain drive, sprocket, gear drive and a combination of any of the foregoing.

8. The floating wave powered electric generating device of claim 5, wherein when said third buoyant member is positioned on a wave trough during said wave motion, such that, said first buoyant member and said second buoyant member being positioned on a wave crest, causing said primary shaft of said third buoyant member to rotate in a clockwise direction.

9. The floating wave powered electric generating device of claim 8, wherein when said third buoyant member is positioned on said wave crest during said wave motion, such that, said first buoyant member and said second buoyant member being positioned on said wave trough, causing said primary shaft of said central buoyant member to rotate in a counter-clockwise direction.

10. A floating wave powered electric generating device comprising:
a first buoyant member;
a second buoyant member; and
a third buoyant member placed intermediate to said first buoyant member and said second buoyant member;
a first interconnector configured to pivotally attach said third buoyant member to said first buoyant member; and
a second interconnector configured to rigidly attach said third buoyant member to said second buoyant member;
wherein said first buoyant member, said second buoyant member, and said third buoyant member operably floating along a wave motion of a wave-driven water body, said third buoyant member comprises
a primary shaft disposed along a longitudinal axis of said third buoyant member,
a secondary shaft disposed adjacently and parallel along said longitudinal axis of said third buoyant member, said secondary shaft operably coupled to said primary shaft,
a large double sprocket mounted on said primary shaft and configured to rotate integrally with said primary shaft,
a first small sprocket mounted on said secondary shaft, said first small sprocket capable of coupling with said large double sprocket through a first chain, said first small sprocket configured to transmit a rotary motion of said primary shaft to said secondary shaft, in such a manner, that a direction of rotation of said first small sprocket is same as a direction of rotation of said large double sprocket, a second small sprocket mounted on said secondary shaft and coupled to said large double sprocket through a second chain along a pair of idler rollers, said second small sprocket is configured to transmit a rotary motion of said primary shaft to said secondary shaft, in such a manner, that a direction of rotation of said second small sprocket is opposite to a direction of rotation of said large double sprocket, and a driving mechanism for transmitting said rotary motion of said secondary shaft to an electric generator, said electric generator is capable of generating electric power from said rotary motion transmitted to said electric generator.

11. The floating wave powered electric generating device of claim 10, wherein said driving mechanism is selected from a group consisting of belt, pulley, chain drive, sprocket, gear drive and a combination of any of the foregoing.

12. The floating wave powered electric generating device of claim 10, wherein when said third buoyant member is positioned on a wave trough during said wave motion, such that, said first buoyant member and said second buoyant member being positioned on a wave crest, causing said primary shaft of said third buoyant member to rotate in a clockwise direction, and when said third buoyant member is positioned on said wave crest during said wave motion, such that, said first buoyant member and said second buoyant member being positioned on said wave trough, causing said primary shaft of said central buoyant member to rotate in a counter-clockwise direction.

* * * * *